US012793685B2

(12) United States Patent
Joshi et al.

(10) Patent No.: US 12,793,685 B2
(45) Date of Patent: Nov. 10, 2026

(54) SANDWICH-STRUCTURED PANELS AND METHOD OF MANUFACTURE

(71) Applicant: PRATT & WHITNEY CANADA CORP., Longueuil (CA)

(72) Inventors: Ninad Joshi, Brampton (CA); Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 87 days.

(21) Appl. No.: 18/904,382

(22) Filed: Oct. 2, 2024

(65) Prior Publication Data

US 2026/0100179 A1 Apr. 9, 2026

Related U.S. Application Data

(62) Division of application No. 17/086,579, filed on Nov. 2, 2020, now Pat. No. 12,136,407.

(51) Int. Cl.
*G10K 11/168* (2006.01)
*B29C 65/08* (2006.01)
(Continued)

(52) U.S. Cl.
CPC .............. *G10K 11/168* (2013.01); *B32B 3/12* (2013.01); *B32B 3/266* (2013.01); *B32B 37/0076* (2013.01); *B32B 37/06* (2013.01); *B32B 37/146* (2013.01); *B32B 37/18* (2013.01); *B29C 65/08* (2013.01); *B32B 2305/02* (2013.01); *B32B 2307/102* (2013.01); *B32B 2310/028* (2013.01); *B32B 2605/18* (2013.01)

(58) Field of Classification Search
CPC ... G10K 11/168; B32B 37/0076; B32B 37/06; B32B 37/146; B32B 2305/02; B32B 2307/102; B32B 2310/028; B32B 2605/18; B29C 65/08
See application file for complete search history.

(56) References Cited

U.S. PATENT DOCUMENTS 9,034,129 B2 5/2015 Koetting et al.
10,239,150 B2 3/2019 Cooper et al.
(Continued)

FOREIGN PATENT DOCUMENTS

CN 1754688 A 4/2006
CN 1991234 A 7/2007
(Continued)

OTHER PUBLICATIONS

European Patent Office, Communication re. extended European search report for European patent application No. 21206068.5, Apr. 7, 2022.

(Continued)

*Primary Examiner* — George R Koch
(74) *Attorney, Agent, or Firm* — Norton Rose Fulbright Canada LLP

(57) ABSTRACT

Sandwich-structured noise-attenuating and/or structural panels and methods of manufacturing such panels using ultrasonic welding are described. The method includes: receiving a backing member, a sheet and a cellular structure; assembling the cellular structure between the backing member and the sheet; and ultrasonically welding the backing member and the sheet together.

5 Claims, 13 Drawing Sheets

(51) Int. Cl.

| | |
|---|---|
| ***B32B 3/12*** | (2006.01) |
| ***B32B 3/26*** | (2006.01) |
| ***B32B 37/00*** | (2006.01) |
| ***B32B 37/06*** | (2006.01) |
| ***B32B 37/14*** | (2006.01) |
| ***B32B 37/18*** | (2006.01) |

(56) References Cited

U.S. PATENT DOCUMENTS

| | | | |
|---|---|---|---|
| 10,259,170 B2 | 4/2019 | Wang | |
| 11,654,636 B2 | 5/2023 | Wang et al. | |
| 2010/0111675 A1 | 5/2010 | Wojtyczka | |
| 2013/0122244 A1 * | 5/2013 | Patel | B29D 99/0021 156/196 |
| 2014/0326536 A1 * | 11/2014 | Vauchel | G10K 11/002 181/290 |
| 2016/0114550 A1 | 4/2016 | Torriani Laurent et al. | |
| 2019/0084261 A1 | 3/2019 | Herrera | |
| 2019/0161199 A1 * | 5/2019 | Lacko | B64D 33/02 |
| 2019/0301370 A1 | 10/2019 | Joshi et al. | |
| 2020/0095955 A1 | 3/2020 | Davis | |
| 2020/0222984 A1 | 7/2020 | Binek et al. | |
| 2022/0134675 A1 | 5/2022 | Vichniakov et al. | |

FOREIGN PATENT DOCUMENTS

| | | |
|---|---|---|
| CN | 100467933 C | 3/2009 |
| CN | 103858159 A | 6/2014 |
| CN | 107023402 A | 8/2017 |
| CN | 107521112 A | 12/2017 |
| EP | 2942184 A1 | 11/2015 |
| EP | 3626958 A1 | 3/2020 |
| WO | 2009143002 A2 | 11/2009 |
| WO | 2010038314 A1 | 4/2010 |

OTHER PUBLICATIONS

European Patent Office, Communication pursuant to Article 94(3) EPC for European patent application No. 21206068.5, Sep. 18, 2024.

* cited by examiner

SANDWICH-STRUCTURED PANELS AND METHOD OF MANUFACTURE

CROSS REFERENCE TO RELATED APPLICATION(S)

This is a division of U.S. patent application Ser. No. 17/086,579 filed on Nov. 2, 2020, now U.S. Pat. No. 12,136,407 B2, the entire contents of which are hereby incorporated herein by reference.

TECHNICAL FIELD

The disclosure relates generally to aircraft components, and more particularly to sandwich-structured panels.

BACKGROUND

A gas turbine engine powering an aircraft in flight produces noise and acoustic treatment in the engine can be used to attenuate some of the noise. A single-degree of freedom (SDOF) acoustic panel construction can include a honeycomb core disposed between a backing sheet and a porous (e.g., perforated) facing sheet. The space between the backing sheet and the facing sheet defines a noise-attenuating cavity. A double-degree of freedom (DDOF) acoustic panel construction can include two honeycomb cores joined together at an intermediate porous septum. The arrangement of the two honeycomb cores and the septum are disposed between a backing sheet and a porous (e.g., perforated) facing sheet to define two noise-attenuating cavities.

Components of such acoustic treatment are typically assembled and joined together using an adhesive reticulation process where a film-adhesive is used to join the edges of the honeycomb cells to the facing sheet and backing sheet. During the joining process, some excess adhesive material can flow into and block holes formed into the facing sheet of the acoustic panel. The blocking of the holes by the adhesive material can reduce the noise attenuation efficiency of the acoustic panel. Existing approaches for securing components of the panels together can also take away space that could otherwise be used as acoustically treated areas of the panels. Improvement is desirable.

SUMMARY

In one aspect, the disclosure describes a method of manufacturing a sandwich-structured panel. The method comprises:

receiving a first skin, a second skin and a cellular core;

assembling the cellular core with the first and second skins so that:

the cellular core is disposed between the first and second skins;

the first skin has a peripheral portion disposed outside a periphery of the cellular core;

the second skin has a peripheral portion disposed outside the periphery of the cellular core and facing the peripheral portion of the first skin, the peripheral portion of the second skin being adjacent the peripheral portion of the first skin; and ultrasonically welding the peripheral portion of the first skin and the peripheral portion of the second skin together.

In another aspect, the disclosure describes a method of manufacturing an aircraft component. The method comprises:

receiving a backing member, a sheet and a cellular structure;

assembling the cellular structure between the backing member and the sheet; and ultrasonically welding the backing member and the sheet together.

In a further aspect, the disclosure describes a sandwich-structured panel comprising:

a first skin, a second skin disposed relative to the first skin to define a cavity between the first and second skins; and a cellular core disposed in the cavity between the first and second skins;

wherein:

the first skin has a peripheral portion disposed outside a periphery of the cellular core;

the second skin has a peripheral portion disposed outside the periphery of the cellular core and facing the peripheral portion of the first skin, the peripheral portion of the second skin being adjacent the peripheral portion of the first skin; and the peripheral portion of the first skin and the peripheral portion of the second skin are welded together.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Sandwich-structured components (e.g., panels) of aircraft and methods for manufacturing such components are described herein. The components may be suitable for use in various structural and/or noise-attenuating applications including on structures (i.e., airframes) of aircraft or other mobile platforms, in aircraft engines, in automotive applications, buildings and/or in other structural applications for example. In various embodiments, the components described herein may include or be part of walls, panels, liners or ducts for example. In some embodiments, the components may serve as acoustic treatment and may be referred to as "acoustic panels" or "acoustic liners" with desirable noise-attenuating properties. Such components may be installed to line a duct (e.g., inlet or bypass duct) of a gas turbine engine or may be installed in any other location(s) such as inside a passenger cabin of an aircraft or on the exterior of an aircraft where noise attenuation is desirable. While the following description refers to acoustic treatment (e.g., panels) for aircraft applications, it is understood that sandwich-structured components and methods described herein may be suitable for use in other applications.

In some embodiments, the components and methods described herein make use of ultrasonic welding for joining parts of the components together so that the need for adhesive material (e.g., glue) used in conventional assembly methods such as adhesive reticulation can be reduced or eliminated. In the case of acoustic panels, the reduction or elimination of adhesive material can reduce or eliminate the risk of excess adhesive material flowing into and blocking holes formed into the facing sheet and/or the septum of such acoustic panels. In some embodiments, the use of ultrasonic welding may simplify the construction of sandwich-structured panels. In some embodiments, the ultrasonically-welded joints between parts of acoustic panels may make efficient use of space to leave more space available for acoustically treated areas of acoustic panels.

Terms such as "attached", "connected" and "coupled" may include both direct attachment, connection or coupling (in which two elements contact each other) and indirect attachment, connection or coupling (in which at least one additional element is located between the two elements). The term "substantially" as used herein may be applied to modify any quantitative representation which could permissibly vary without resulting in a change in the basic function to which it is related. Aspects of various embodiments are described through reference to the drawings.

Figure 1:
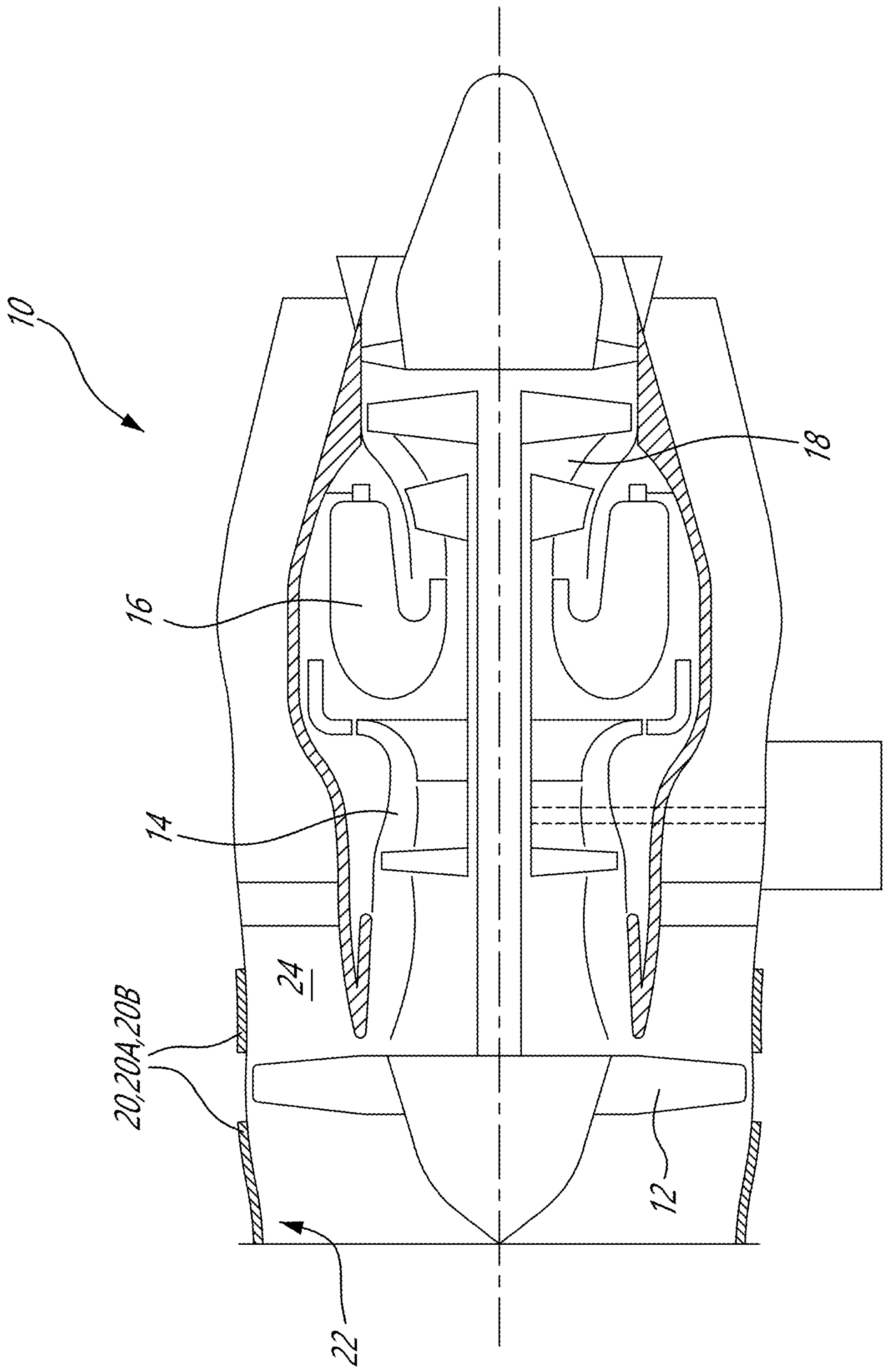
FIG. 1 shows an axial schematic cross-section view of an exemplary turbofan gas turbine engine including one or more sandwich-structured panels as described herein.

FIG. 1 illustrates gas turbine engine 10 of a type preferably provided for use on an aircraft, generally comprising in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Engine 10 may include one or more sandwich-structured panels 20, 20A, 20B (referred generically herein as "panel 20") used as acoustic treatment (e.g., panels or liners) disposed at different locations within engine 10 to obtain desired noise-attenuation. It is understood that panel 20 may be used in other types of engines (e.g., turboshaft, turboprop, auxiliary power unit (APU)) and in other types of noise-attenuating applications. In some embodiments, panel 20 may be used in structural applications that are not necessarily intended to provide noise-attenuation.

In some situations, panel(s) 20 (e.g., acoustic liner) may be disposed upstream and/or downstream of fan 12 inside of engine 10 so that noise produced by fan 12 may be attenuated. For example, panel(s) 20 may be integrated in inlet 22 of engine 10 and disposed upstream of fan 12. Alternatively or in addition, panel(s) 20 may be integrated in (e.g., annular) bypass duct 24 and define a radially-outer and/or a radially-inner surface of bypass duct 24. In various embodiments, panel 20 may be suitable for use in a fan case, intermediate case, bypass duct 24, exhaust duct, thrust reverser duct, and an exhaust center body of engine 10 for example. In some embodiments, panel 20 may be suitable for use in a hot core section duct of engine 10 where adhesively bonded acoustic materials would typically not be used due to elevated temperatures. Depending on the specific application, panel 20 may have a generally planar or non-planar (e.g., curved, arcuate, annular) form (e.g., of single or double curvature).

Figure 2:
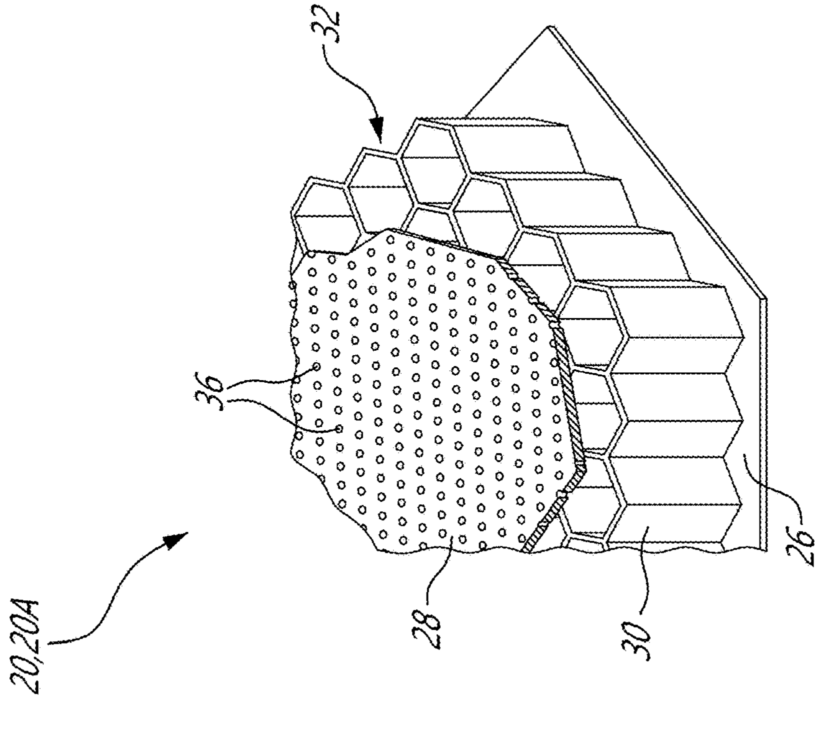
FIG. 2 is a perspective cutaway view of an exemplary sandwich-structured panel in the form of a single-degree-of-freedom (SDOF) acoustic panel.

FIG. 2 is a perspective cutaway view of an exemplary sandwich-structured panel 20A in the form of a single-degree-of-freedom (SDOF) acoustic panel. SDOF acoustic panel 20A may include backing member 26, facing sheet 28 and cellular structure 30 disposed between backing member 26 and facing sheet 28. Facing sheet 28 may be spaced apart from backing member 26 to define (e.g., noise-attenuating) cavity 32 between backing member 26 and facing sheet 28.

As explained below, cellular structure 30 may be attached to backing member 26 and/or facing sheet 28 through ultrasonic welding. Cellular structure 30 may include walls serving as partitions defining sub-cavities (cells) within noise-attenuating cavity 32. Cellular structure 30 may serve as a core of SDOF acoustic panel 20A. In some embodiments, backing member 26 may have the form of a sheet or plate. However, it is understood that backing member 26 may be of any suitable shape and thickness. For example, backing member 26 may be a part of another component of engine 10 such as a wall of inlet 22 or bypass duct 24 of engine 10 that provides a suitable back wall for noise-attenuating cavity 32. Backing member 26 and facing sheet 28 may serve as skins of SDOF acoustic panel 20A disposed on opposite sides of cellular structure 30.

Figure 3:
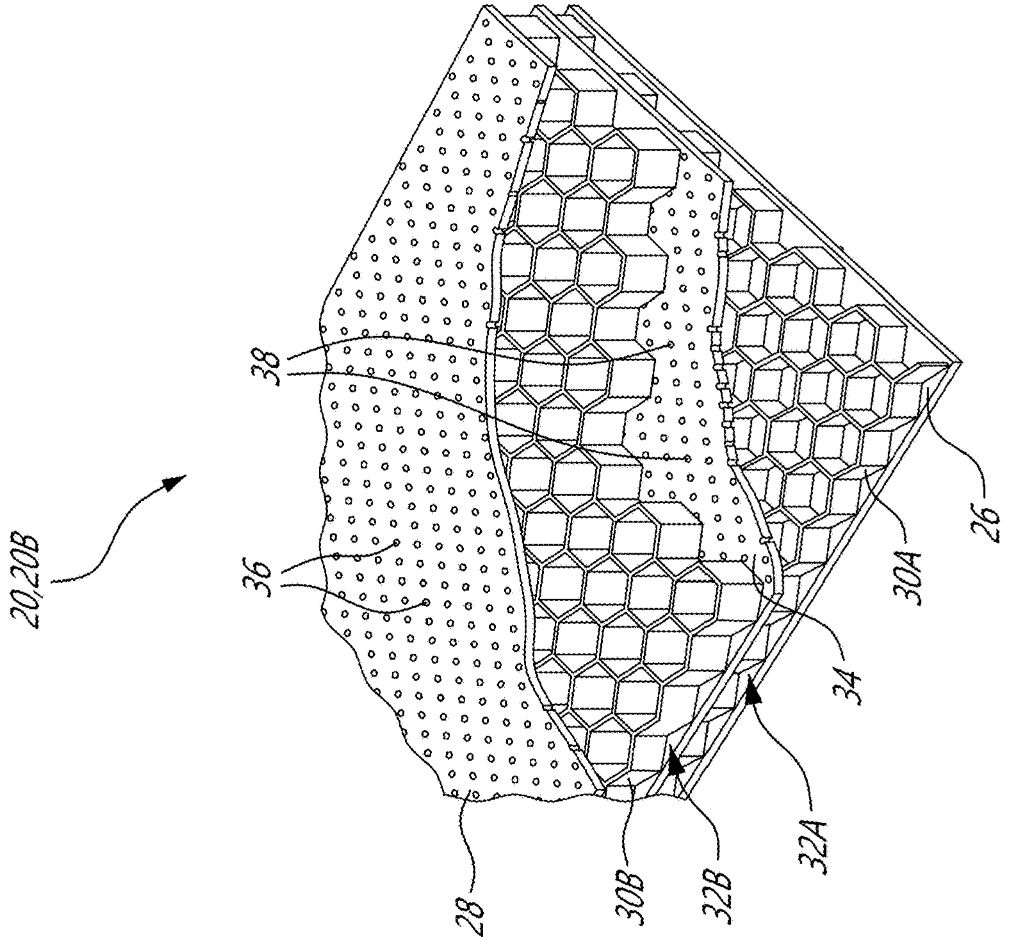
FIG. 3 is a perspective cutaway view of another exemplary sandwich-structured panel in the form of a double-degree-of-freedom (DDOF) acoustic panel.

FIG. 3 is a perspective cutaway view of an exemplary sandwich-structured composite panel 20B in the form of a double-degree-of-freedom (DDOF) acoustic panel. DDOF acoustic panel 20B may include backing member 26, septum 34, cellular structures 30A, 30B and facing sheet 28. Septum 34 may be spaced apart from backing member 26 to define (e.g., noise-attenuating) cavity 32A between backing member 26 and septum 34. Cellular structure 30A may be disposed between backing member 26 and septum 34. As explained below, cellular structure 30A may be attached to backing member 26 and/or septum 34 through ultrasonic welding.

Facing sheet 28 may be spaced apart from septum 34 to define (e.g., noise-attenuating) cavity 32B between septum 34 and facing sheet 28. Cellular structure 30B may be disposed between facing sheet 28 and septum 34. Similarly, cellular structure 30B may be attached to facing sheet 28 and/or septum 34 through ultrasonic welding. Due to its configuration, DDOF acoustic panel 20B may, in some embodiments, resonate and attenuate noise at multiple frequencies or within a wider frequency range than SDOF acoustic panel 20A.

In reference to the SDOF and DDOF acoustic panels 20A, 20B of FIGS. 2 and 3 respectively, cellular structures 30, 30A, 30B (referred generally as "cellular structure 30") may each include a plurality of open-ended juxtaposed cells of hexagonal or other (e.g., triangular, rectangular, polygonal) cross-sectional profile. For example, in the case of SDOF acoustic panel 20A, the walls defining the cells of cellular structure 30 may extend from backing member 26 to facing sheet 28 and may provide structural support between facing sheet 28 and backing member 26. In the case of DDOF acoustic panel 20B, the walls defining the cells of cellular structure 30B may extend from septum 34 to facing sheet 28, and the walls defining the cells of cellular structure 30A may extend from backing member 26 to septum 34.

In some embodiments, cellular structure 30 may be of a type referred to as "honeycomb" core. Cellular structure 30 may be made from a suitable non-metallic material (e.g., polymer), fiber-reinforced composite material (e.g., carbon fibre/resin matrix) or metallic (e.g., aluminum-based) material for example.

In noise-attenuating applications, outer facing sheet 28 may be porous (e.g., perforated) and may include a plurality of through holes 36 formed (e.g., drilled) therein. In some embodiments, holes 36 may have a substantially circular cross-sectional shape but other cross-sectional shapes such as ovals or rectangles may also be suitable. For example, holes 36 may include one or more slits. In some embodiments, one or more holes 36 may be in communication with each cell defined by cellular structure 30 and each cell may function as a resonator. In some embodiments, a highly resistive material such as a mesh of porous material may be disposed inside or outside the cells defined by cellular structure 30 (e.g., bonded above or below facing sheet 28) and may alter the noise-attenuating performance of SDOF acoustic panel 20A. Facing sheet 28 may be made from a suitable metallic, plastic or composite material. For example, facing sheet 28 may be made from fiber-reinforced composite material (e.g., carbon fibers embedded in a polymeric resin) or metallic (e.g., aluminum-based or metal) material. In some embodiments, facing sheet 28 may have a thickness permitting ultrasonically welding facing sheet 28 to another component. In various embodiments, facing sheet 28 may have a thickness of between 1 mm and 6.5 mm for example. However, other thicknesses may be suitable for various applications.

Backing member 26 may be unperforated and include a non-porous impermeable sheet, plate or other relatively hard material. Backing member 26 may be made from a suitable metallic, plastic or composite material. For example, backing member 26 may be made from fiber-reinforced composite material (e.g., carbon fibers embedded in a polymeric resin) or metallic (e.g., aluminum-based or metal) material. In some embodiments, backing member 26 may have a thickness permitting ultrasonically welding backing member 26 to another component.

In noise-attenuating applications, septum 34 may be a porous (e.g., perforated) sheet or plate and may include a plurality of through holes 38 formed (e.g., drilled) therein for acoustically connecting noise-attenuating cavities 32A, 32B together. Septum 34 may serve as an intermediate (e.g., perforated) skin disposed between cellular structure 30A and cellular structure 30B. Septum 34 may be made from a suitable metallic, plastic or composite material. For example, septum 34 may be made from fiber-reinforced composite material (e.g., carbon fibers embedded in a polymeric resin), metallic (e.g., aluminum-based or metal) material, or fibrous material such as fiber cloth and mesh cloth. In some embodiments, septum 34 may include a perforated sheet of similar of substantially the same construction as facing sheet 28. In some embodiments, septum 34 may have a thickness permitting ultrasonically welding septum 34 to another component. In various embodiments, septum 34 may have a thickness of between 0.3 mm and 2.5 mm for example. However, other thicknesses may be suitable for various applications.

Cellular structure 30 may serve as a relatively low-density core disposed between two relatively stronger skins such as backing member 26, facing sheet 28 and/or septum 34. In the context of structural applications, the resulting sandwich-structured panel 20 may provide a combination of relatively high structural rigidity and low weight, as the skins provide resistance to in-plane and lateral bending loads, while the core provides resistance to shear loads. In non-noise-attenuating applications, facing sheet 28 and/or septum 34 may not be perforated (i.e., devoid of through holes 36, 38). Materials of components of panel 20 may be selected to be compatible for ultrasonic welding together.

Figure 4:
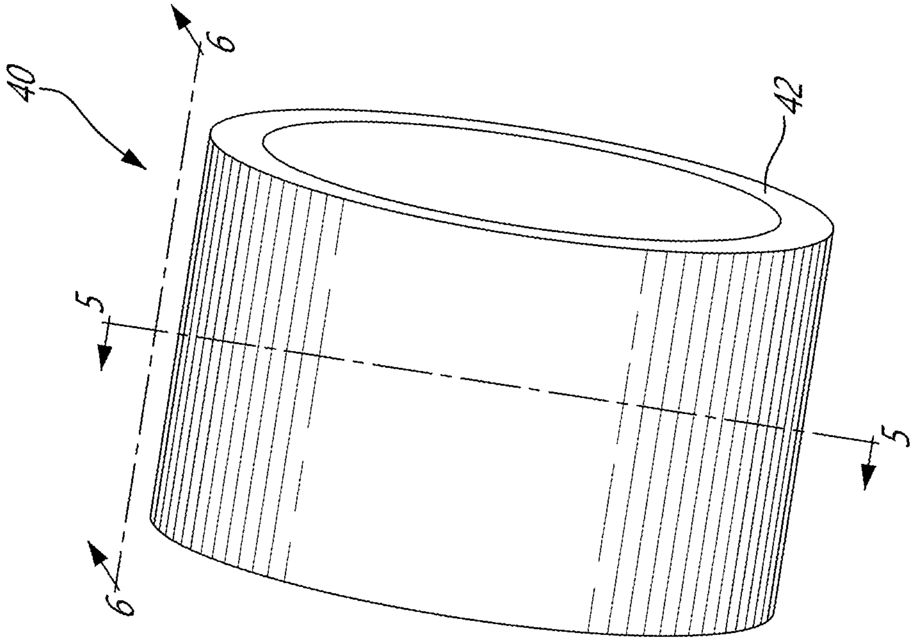
FIG. 4 is a perspective schematic view of an exemplary duct including a sandwich-structured panel as described herein.

FIG. 4 is a perspective schematic view of an exemplary duct 40 that may include one or more panels 20. Duct 40 may be part of inlet 22 of engine 10, or may form part of bypass duct 24 of engine 10 for example. Duct 40 may include (e.g., annular) base 42 to which panel(s) 20 may be mounted. Base 42 may be made from a suitable polymeric material, fiber-reinforced composite material (e.g., carbon fibers embedded in a polymeric resin) or metallic (e.g., aluminum-based) material.

Figure 5:
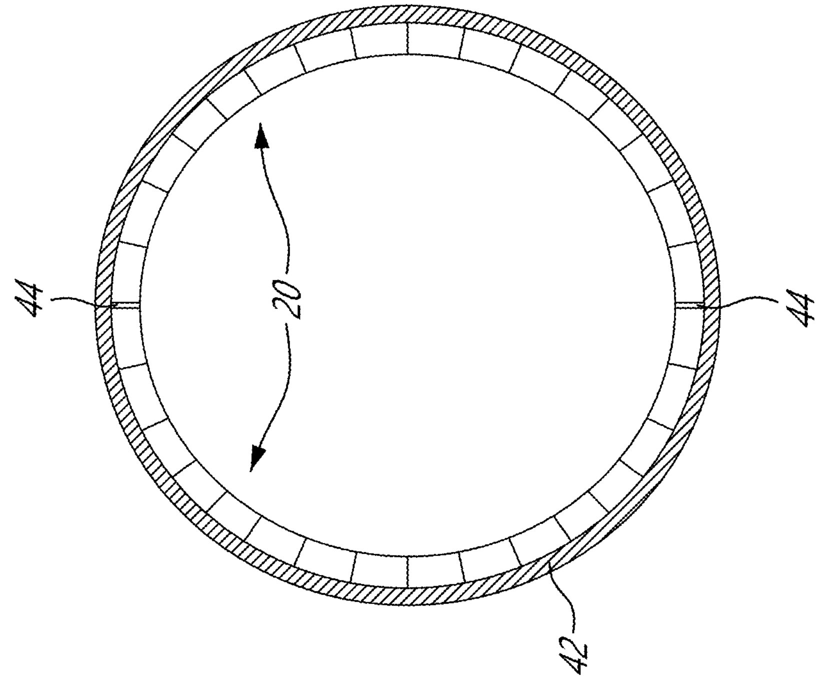
FIG. 5 is a schematic cross-section view of the duct of FIG. 4 taken along line 5-5 in FIG. 4.

FIG. 5 is a schematic cross-section view of duct 40 taken along line 5-5 in FIG. 4. One or more panel(s) 20 may be mounted to a radially-inner side and/or to a radially-outer side of base 42. In some embodiments, a single panel 20 may be mounted to base 42 and cover part or substantially an entirety of the circumferential span of base 42. In some embodiments, a plurality of panels 20 may be mounted to base 42 in a circumferentially adjacent manner to cover part or substantially an entirety of the circumferential span of base 42. In the example shown in FIG. 5, two adjacent semicircular panels 20 are shown mounted to a radially-inner side of base 42. Intermediate parting lines 44 are shown schematically between the adjacent panels 20. A plurality of panels 20 may be mounted to any suitable base 42 to cooperatively provide an acoustically treated area of a desired shape and size.

Figure 6:
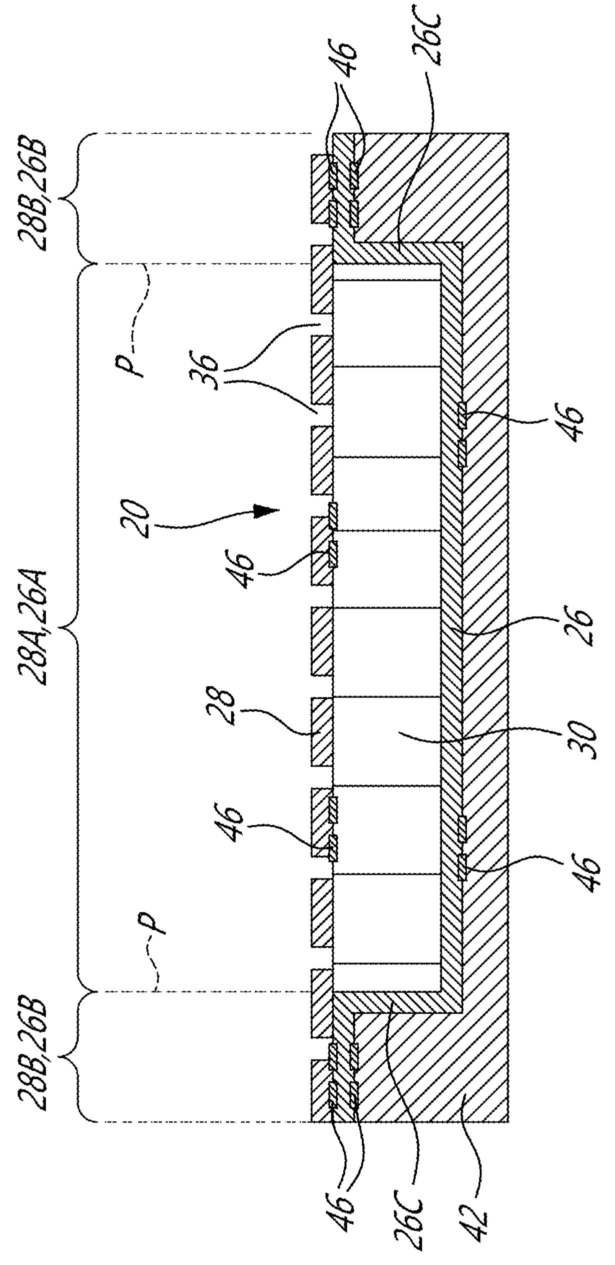
FIG. 6 is a schematic cross-section view of the duct of FIG. 4 taken along line 6-6 in FIG. 4.

FIG. 6 is a schematic cross-section view of duct 40 of FIG. 4 taken along line 6-6 in FIG. 4. Panel 20 may be formed to fit a profile defined in base 42 of duct 40 and may be inserted in base 42 as shown in FIG. 6. Cellular structure 30 may have periphery P shown in FIG. 6 and representing an external boundary of cellular structure 30 within a plane intersecting and substantially parallel to panel 20. In other words, periphery P may be an outer edge of an acoustically treated area of panel 20.

Backing member 26 may have a cross-sectional profile that substantially conforms to the cross-sectional profile of base 42. For example, backing member 26 may have a "top hat" shaped cross-sectional profile including main portion 26A disposed inside periphery P of cellular structure 30 and peripheral portions 26B disposed outside of periphery P of cellular structure 30. In other words, backing member 26 may extend outwardly beyond periphery P of cellular structure 30. Backing member 26 may also include transitions portions 26C that interconnect respective peripheral portions 26B to main portion 26A. Transition portions 26C may provide step-shaped transitions between main portion 26A and respective peripheral portions 26B. The step-shaped transition provided by transition portion 26C may eliminate the need for a ramped or "pan down" region of panel 20 that would take away from the acoustically treated area of panel 20. Accordingly, the step-shaped transitions provided by transition portions 26C may facilitate a larger acoustically treated area in the space available for panel 20 compared to ramped transitions for example. In some embodiments, transition portions 26C may be substantially perpendicular to main portion 26A. However, in some embodiments, transition portions 26C may instead be non-perpendicular to main portion and provide ramp-shaped transitions interconnecting main portion 26A with respective peripheral portions 26B.

Facing sheet 28 may include main portion 28A disposed inside periphery P of cellular structure 30 and peripheral portions 28B disposed outside of periphery P of cellular structure 30. In other words, facing sheet 28 may extend outwardly beyond periphery P of cellular structure 30. Peripheral portions 28B of facing sheet 28 may face respective corresponding peripheral portions 26B of backing member 26. Peripheral portions 28B of facing sheet 28 may be adjacent and (e.g., ultrasonically) welded to respective corresponding peripheral portions 26B of backing member 26.

Components of panel 20 may be welded together or to base 42 at weld junctions 46. Additional or fewer weld junctions 46 than those shown in FIG. 6 may be used. For example, main portion 26A of backing member 26 may be welded to base 42. Peripheral portions 26B of backing member 26 may be welded to base 42. Peripheral portions 26B of backing member 26 and peripheral portions 28B of facing sheet 28 may be welded together to form a lap joint. Main portion 28A of facing sheet 28 and cellular structure 30 may be welded together.

Figure 7:
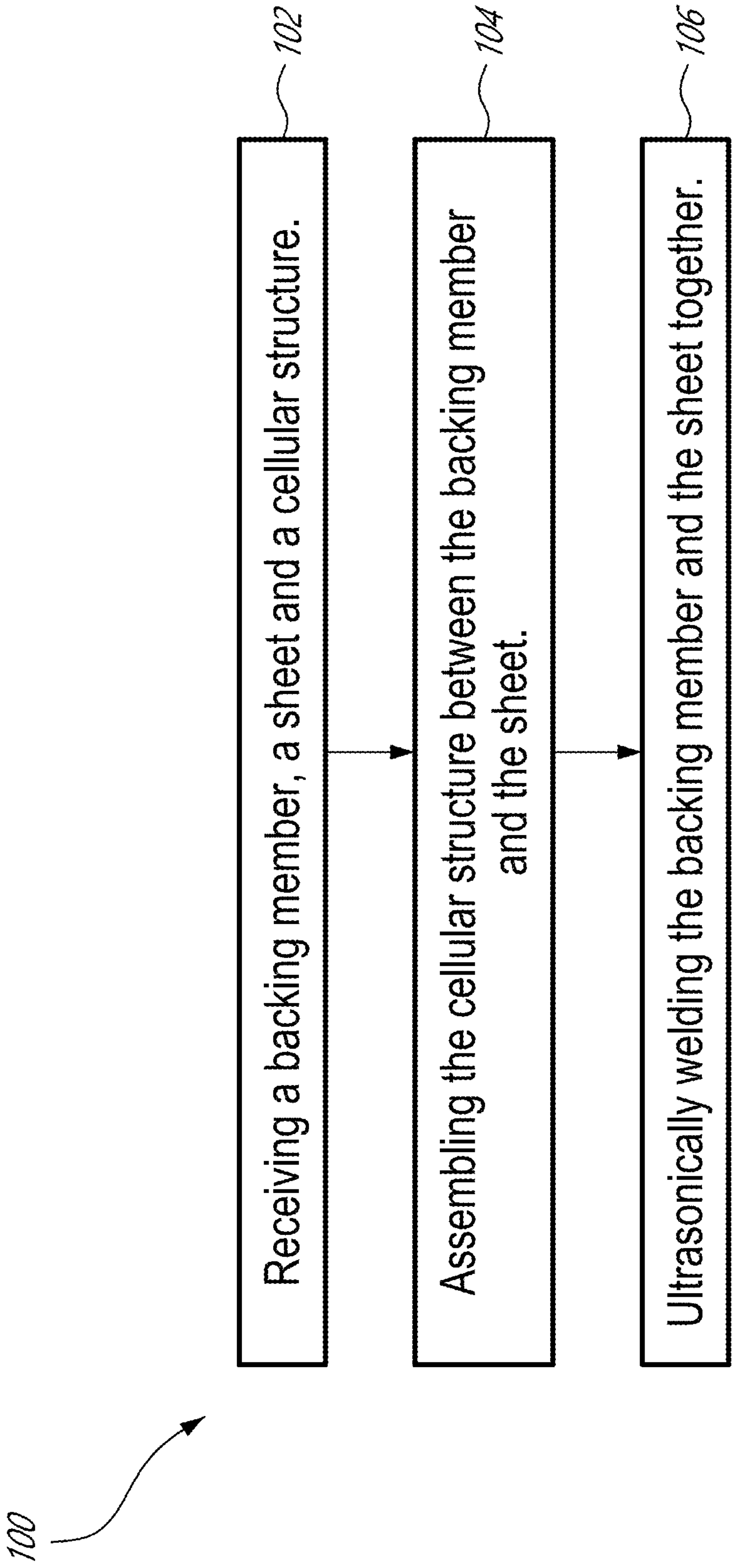
FIG. 7 is a flowchart illustrating an exemplary method of manufacturing an aircraft component in the form of a sandwich-structured panel.

FIG. 7 is a flowchart illustrating an exemplary method 100 of manufacturing a sandwich-structured component such as panel 20. Aspects of method 100 may be combined with method steps or other aspects described herein. Aspects of method 100 are illustrated in FIGS. 8A-9B. Method 100 may include: receiving backing member 26, facing sheet 28 (or septum 34), and cellular structure 30 (block 102); assembling cellular structure 30 between backing member 26 and facing sheet 28 (or septum 34) (block 104); and ultrasonically welding backing member 26 and facing sheet 28 (or septum 34) together (block 106).

Weld junctions 46 (shown in FIG. 6) may be produced by ultrasonic welding as explained further below. Alternatively, weld junctions 46 may be made using other suitable low-temperature methods of welding such as seam welding or linear friction welding. Weld junctions 46 may include a union or fusion of components made after rendering part of the components to be joined soft or pasty using heat, and with or without the use of fusible filler material.

Figure 8A:
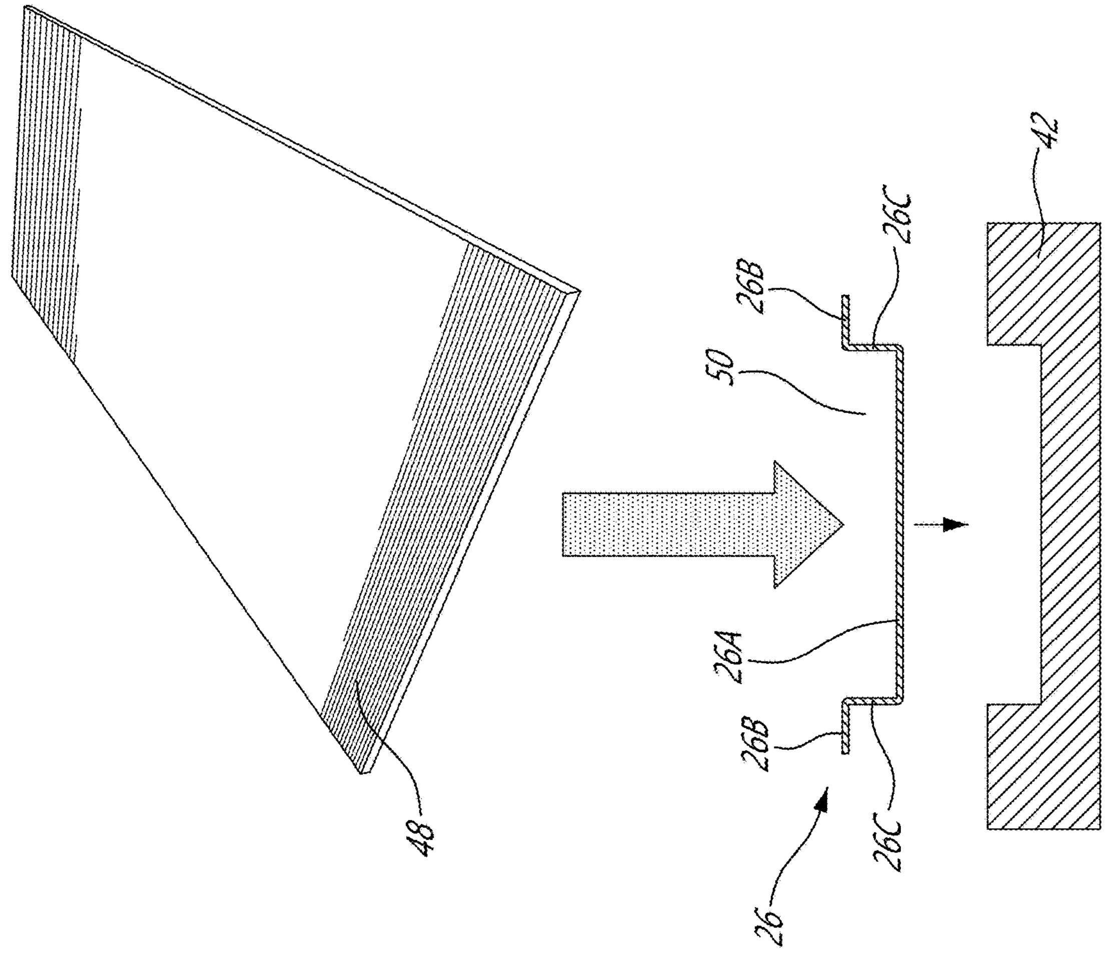
FIG. 8A schematically illustrates a backing member of a sandwich-structured panel formed from a precursor sheet.

FIG. 8A schematically illustrates backing member 26 of panel 20 formed from (e.g., flat) precursor sheet 48 prior to assembly with base 42. Backing member 26 may be formed to the desired shape using any suitable metal or polymer forming techniques. In some embodiments where backing member 26 is made from a metallic material, backing member 26 may formed from precursor sheet 48 by stamping or conventional welding for example. In some embodiments where backing member 26 is made from a polymer, backing member 26 may be thermoformed from precursor sheet 48 or injection molded for example. In some embodiments, backing member 26 may define recess 50 in which cellular structure 30 may be inserted. Peripheral portions 26B may be disposed outside a periphery of recess 50.

Figure 8B:
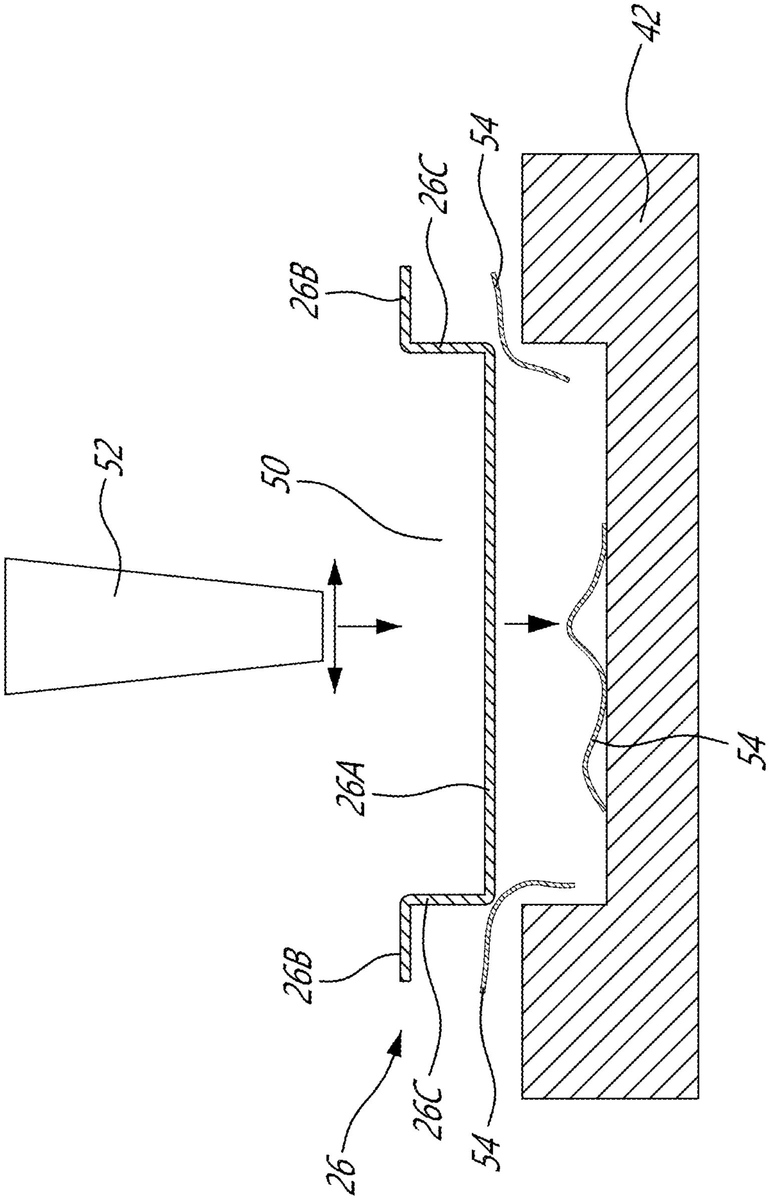
FIG. 8B schematically illustrates assembling the backing member of FIG. 8A with a base and ultrasonically welding the backing member to the base.

FIG. 8B schematically illustrates assembling backing member 26 with base 42 and ultrasonically welding backing member 26 to base 42 using sonotrode 52. In embodiments where panel 20 is integrated with base 42, base 42 may be held on a suitable anvil to facilitate the ultrasonic welding process. In embodiments where panel 20 is not integrated with and welded to base 42, a suitable anvil or other suitable work holding equipment may be used to hold backing member 26 during assembly of panel 20 and during ultrasonic welding. In some embodiments, optional metallic foil 54 may be laid between the components to be joined to facilitate ultrasonic welding. In some embodiments where polymeric components of panel 20 are ultrasonically welded together, foil 54 may be a relatively thin piece made from a compatible polymeric material and laid between the components to be joined to facilitate ultrasonic welding.

The use of ultrasonic welding may provide flexibility in joining various materials via relatively strong structural bonds compared to some adhesive bonding approaches. In some embodiments, the relatively high bond strength may facilitate bonding areas of reduced size for weld junctions 46 compared to the use of fasteners such as rivets or bolts. Accordingly, the use of ultrasonic welding may promote an increase in acoustically treated area in a given space, a reduction or elimination of blockage of through holes 36, 38 by adhesive material and/or potentially a weight reduction compared to existing acoustic panels made using other methods.

The ultrasonic welding used herein may be a solid state welding process where no external heat is added for welding. Ultrasonic welding may be performed using sonotrode 52. Sonotrode 52 may be moved to locations to be welded and placed in contact with the workpieces to transmit energy to the workpieces by way of ultrasonic vibration. The ultrasonic vibration may create a dynamic shear stress between the contact surfaces of the workpieces. Due to local plastic deformation and heat generation due to friction between the contact surfaces, joint formation may take place at the interface between the two workpieces. Sonotrode 52 may be associated with a (e.g., piezoelectric) transducer which can convert high frequency electric signal into high frequency mechanical vibration. Oscillating shear forces acting at the interface between the workpieces may cause elastoplastic deformation at the interface. The local temperature may rise at the interface without significantly melting the workpieces and/or filler material. When joining metallic components, the welding may be achieved by disrupting the surface oxide films of the metallic components. Ultrasonic welding may be considered a relatively low heat procedure and may be used to weld metallic materials together, and polymeric materials together.

Figure 8C:
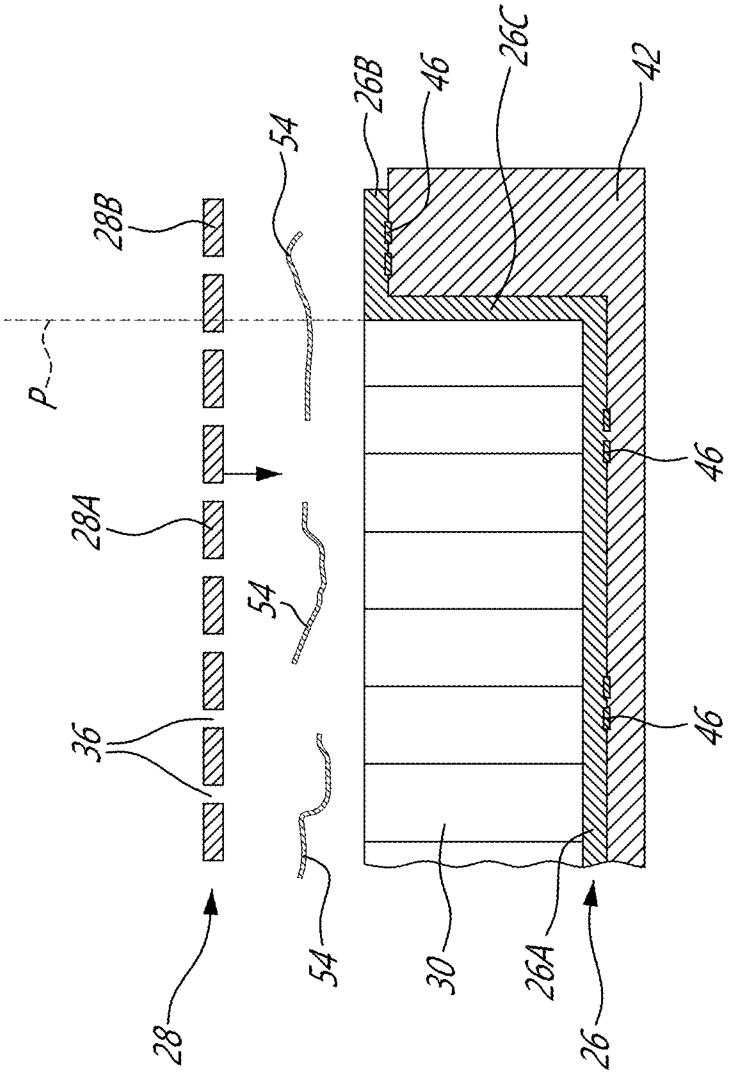
FIG. 8C schematically illustrates assembling a cellular structure and a facing sheet with the backing member of FIG. 8A.

FIG. 8C schematically illustrates assembling cellular structure 30 and facing sheet 28 with backing member 26 after backing member 26 has been installed with (and optionally welded to) base 42. Recess 50 (show in FIG. 8B) may be at least partially filled with cellular structure 30 and covered with facing sheet 28. In some embodiments, foil 54 may be disposed between main portion 28A of facing sheet 28 and cellular structure 30 to facilitate ultrasonic welding therebetween. In some embodiment, foil 54 may be disposed between peripheral portion 28B of facing sheet 28 and peripheral portion 26B of backing member 26 to facilitate ultrasonic welding therebetween.

Figure 8D:
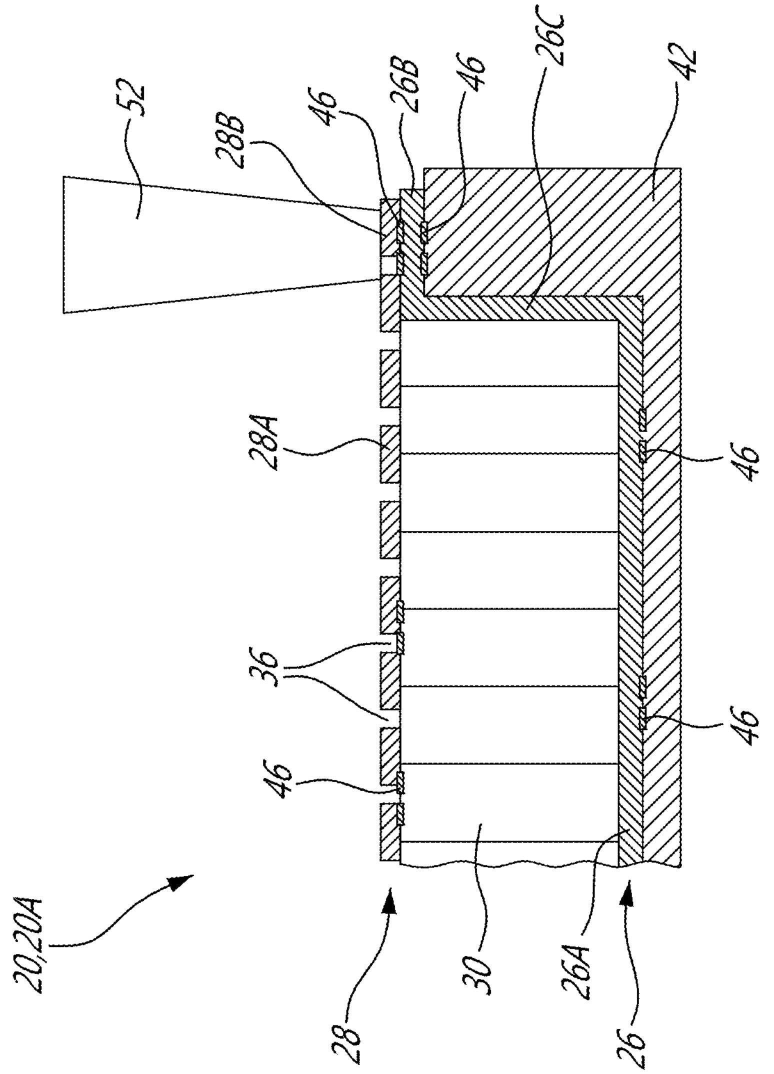
FIG. 8D schematically illustrates ultrasonically welding the facing sheet of FIG. 8C to the backing member of FIG. 8A and to the cellular structure.

FIG. 8D schematically illustrates ultrasonically welding peripheral portion 28B of facing sheet 28 to peripheral portion 26B of backing member 26 to form weld junction 46 using sonotrode 52. In some embodiments, main portion 28A of facing sheet 28 may be ultrasonically welded to cellular portion 30 using sonotrode 52 also.

In some embodiments, base 42 may function as a suitable backing member and a separate intermediate backing member 26 overlaying base 42 may not be required. For example, cellular structure 30 may be inserted into a recess formed in base 42 and peripheral portion 28B of facing sheet 28 may be ultrasonically welded directly to a peripheral portion of base 42 so that base 42 may serve as a backing member of panel 20.

In situations where one or more components such as backing member 26 or facing sheet 28 is made from fiber reinforced composite materials, ultrasonic welding may also be used at the ply lay-up stage to bond plies (e.g., pre-impregnated fabric or unidirectional tape) together and the resulting lay-up may be subsequently consolidated in an autoclave. In other words, a layer-by-layer ultrasonic additive manufacturing (UAM) process may be used to form one or more components of panel 20.

Figure 9A:
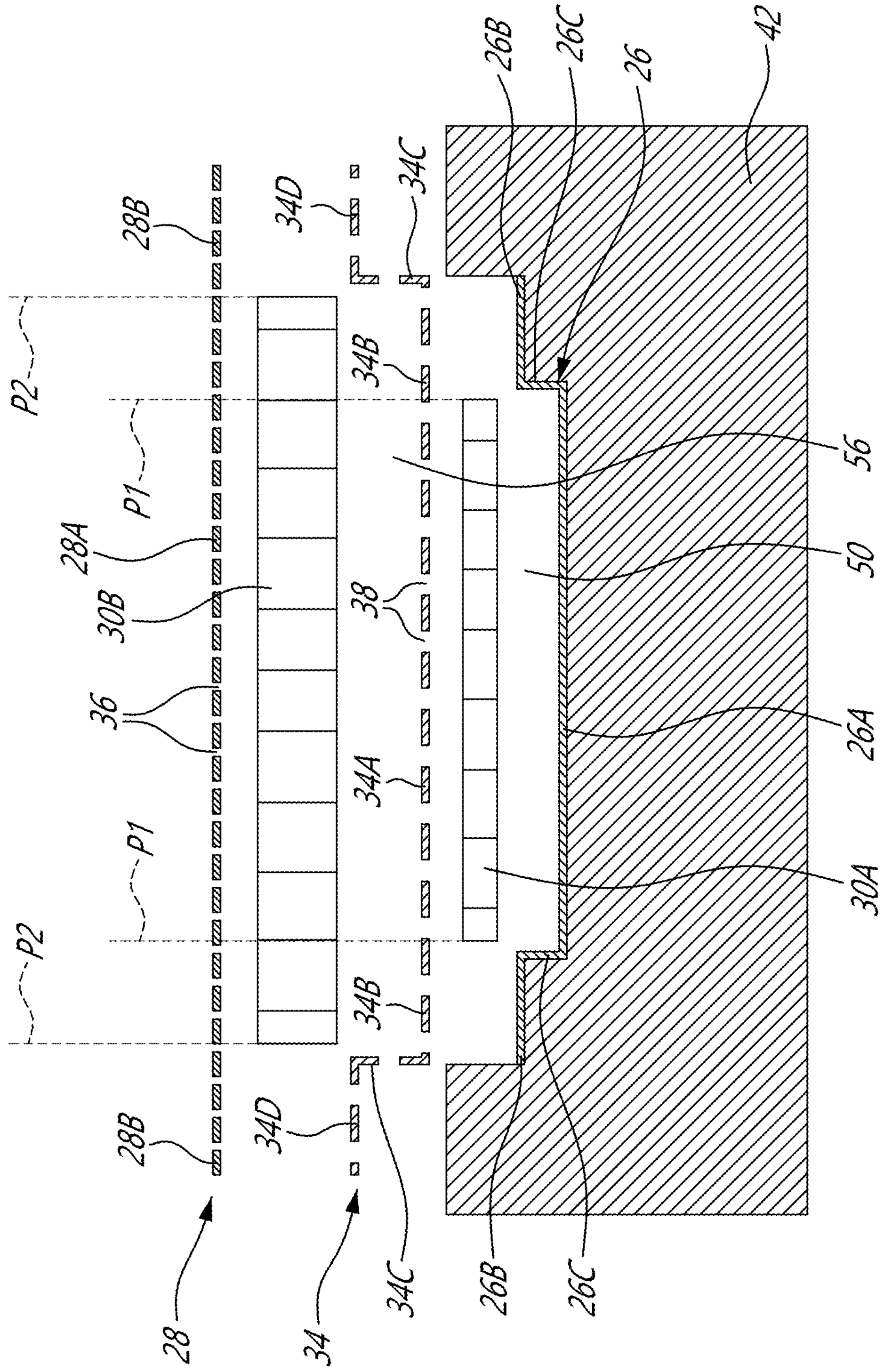
FIG. 9A schematically illustrates an exploded view of a sandwich-structured panel in the form of a DDOF acoustic panel.

FIG. 9A schematically illustrates an exploded view of DDOF acoustic panel 20B to be assembled with base 42. Method 100 and other aspects described above in relation to manufacturing SDOF acoustic panel 20A may be used to make DDOF acoustic panel 20B. In some embodiments, backing member 26 may be installed with base 42 and optionally ultrasonically welded to base 42 as described above. Cellular structure 30A may be assembled to be disposed between backing member 26 and septum 34 which may be perforated with through holes 38. Cellular structure 30A may be inserted into recess 50 defined by backing member 26. Septum 34 may have first peripheral portions 34B disposed outside periphery P1 of cellular structure 30A. First peripheral portions 34B of septum 34 may be facing and disposed adjacent to respective peripheral portions 26B of backing member 26 to provide a lap joint to permit ultrasonic welding.

Septum 34 may also be formed to have a "top hat" shape similar to backing member 26. Cellular structure 30B may be installed between septum 34 and facing sheet 28. Septum 34 may define recess 56 in which cellular structure 30B may be inserted. Septum 34 may also have second peripheral portions 34D that are disposed outside a periphery P2 of cellular structure 30B. Second peripheral portions 34D of septum 34 may facilitate ultrasonic welding of septum 34 to base 42. Transition portions 34C may interconnect second peripheral portions 34D to respective first peripheral portions 34B of septum 34. Each transition portion 34C may define a step-shaped transition or a ramp-shaped transition. In some embodiments, transition portions 34C may be substantially perpendicular to main portion 34A of septum 34 disposed within periphery P1 of cellular structure 30A. Peripheral portions 28B of facing sheet 28 may be disposed outside periphery P2 of facing sheet 28. Peripheral portions 28B of facing sheet 28 and corresponding second peripheral portions 34D of septum 34 may face each other and be disposed adjacent each other to define a lap joint to facilitate ultrasonic welding.

In various embodiments, the assembly order of the parts of SDOF acoustic panel 20A or of DDOF acoustic panel 20B may be varied from those depicted herein. For example, the entire SDOF acoustic panel 20A or DDOF acoustic panel 20B may be assembled separately from base 42 and subsequently assembled (e.g., adhesively bonded, welded, fastened) with base 42. One or more optional foils 54 as shown in FIG. 8C may also be used to facilitate ultrasonic welding of components of DDOF acoustic panel 20B.

Figure 9B:
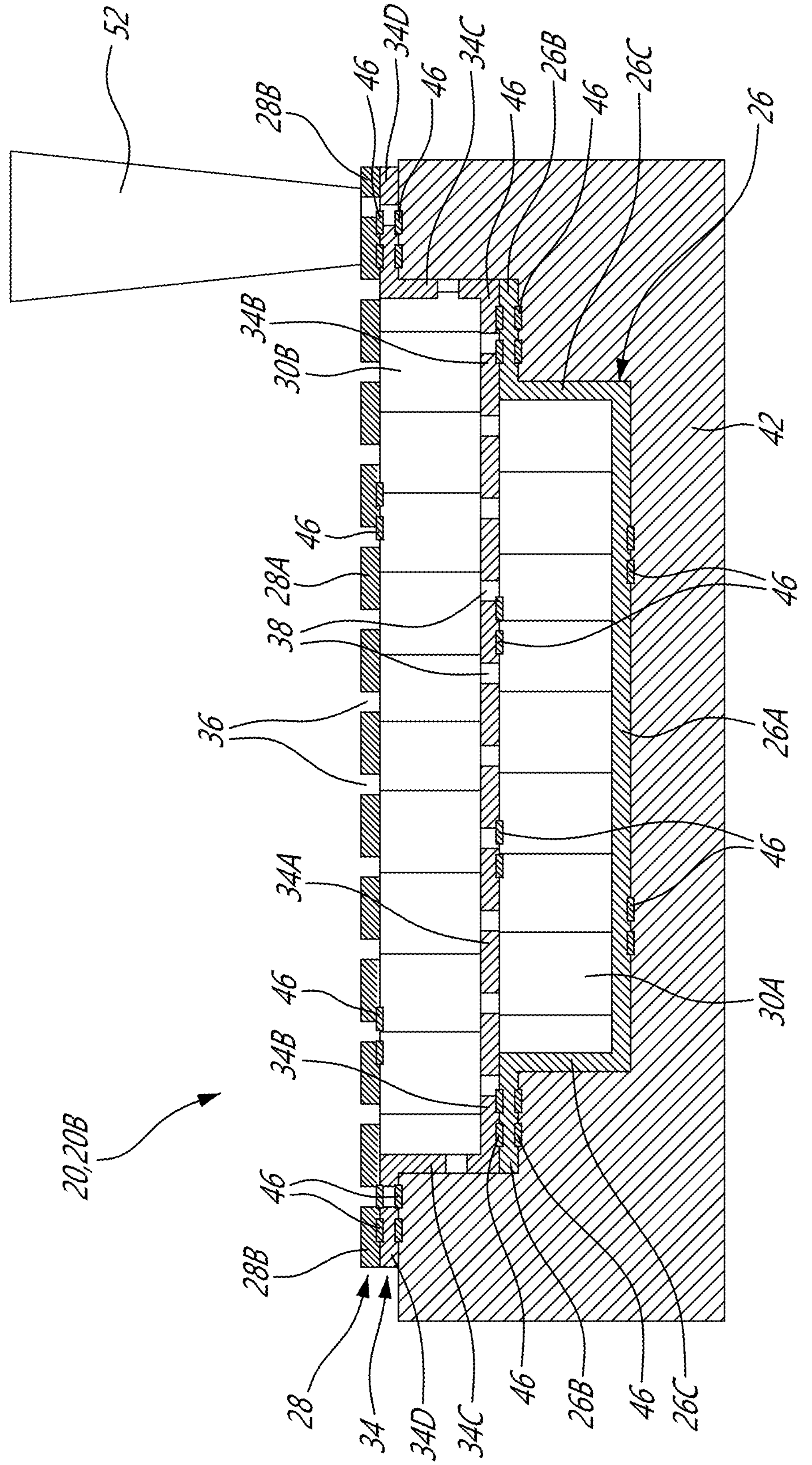
FIG. 9B schematically illustrates ultrasonically welding components of the sandwich-structured panel of FIG. 9A.

FIG. 9B schematically illustrates ultrasonically welding components of DDOF acoustic panel 20B using sonotrode 52. DDOF acoustic panel 20B may contain a plurality of weld junctions 46 throughout DDOF acoustic panel 20B and acoustic welding operations may be carried out between assembly steps to provide sonotrode 52 access to the components to be welded. One or more weld junctions 46 may be produced between main portion 26A of backing member 26 and base 42. One or more weld junctions 46 may be produced between peripheral portion(s) 26B of backing member 26 and base 42. One or more weld junctions 46 may be produced between main portion 34A of septum 34 and cellular structure 30A. One or more weld junctions 46 may be produced between first peripheral portion(s) 34B of septum 34 and respective peripheral portion(s) 26B of backing member 26. One or more weld junctions 46 may be produced between second peripheral portion(s) 34D of septum 34 and base 42. One or more weld junctions 46 may be produced between peripheral portion(s) 28B of facing sheet 28 and respective second peripheral portion(s) 34D of septum 34. One or more weld junctions 46 may be produced between main portion 28A of facing sheet 28 and cellular structure 30B.

In some embodiments, base 42 may function as a suitable backing member and a separate intermediate backing member 26 overlaying base 42 may not be required in the construction of DDOF acoustic panel 20B either. For example, cellular structure 30A may be inserted into a recess formed in base 42 and first peripheral portion 34B of septum 34 may be ultrasonically welded directly to 42 so that base 42 may serve as a backing member of DDOF acoustic panel 20.

Figure 10:
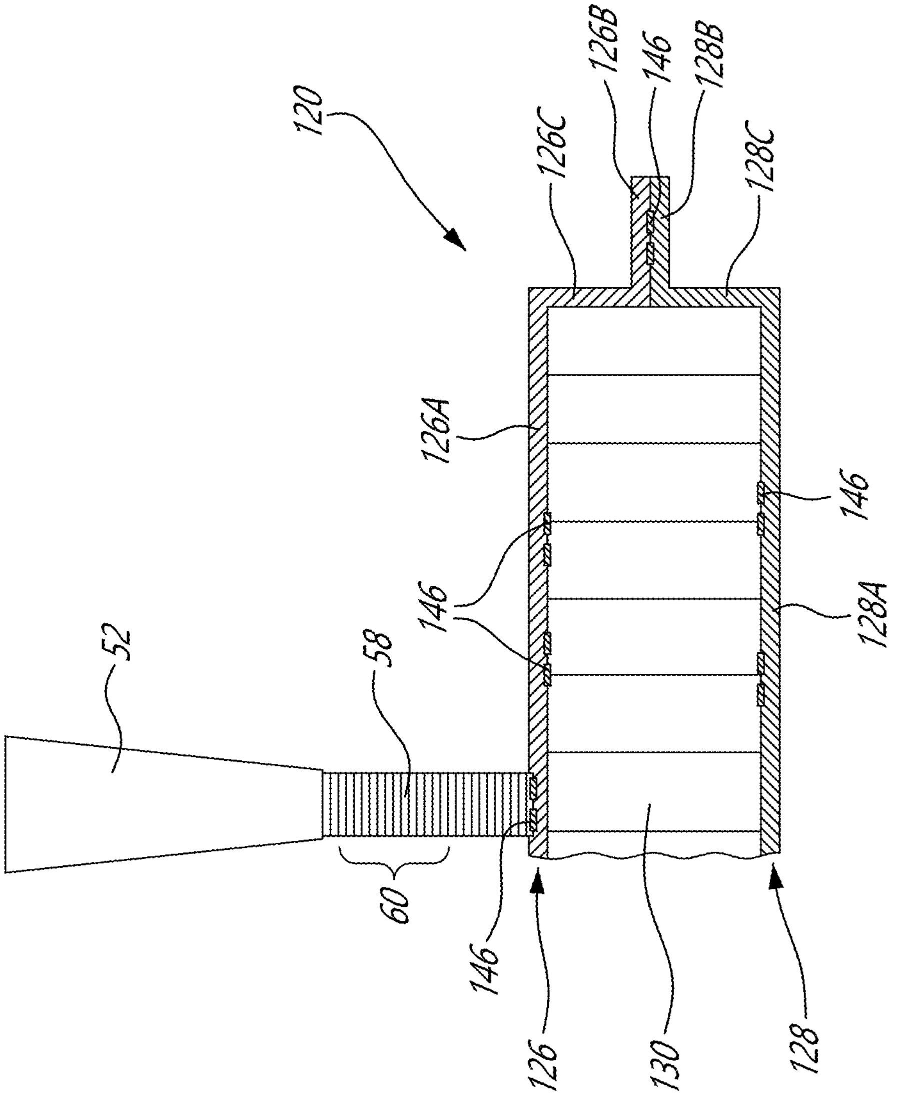
FIG. 10 is a schematic representation of part of another exemplary sandwich-structured panel.

FIG. 10 is a schematic representation of part of another exemplary sandwich-structured panel 120 which may be suitable for structural applications. In some embodiments, first skin 126 and second skin 128 are not perforated. Panel 120 may include elements previously described above and reference numerals for like elements have been incremented by 100. Ultrasonic welding may be used to produce weld junctions 146. One or more weld junctions 146 may be produced between main portion 126A of first skin 126 and cellular structure 130. One or more weld junctions 146 may be produced between main portion 128A of second skin 128 and cellular structure 130. One or more weld junctions 146 may be produced between peripheral portion 126B of first skin 126 and peripheral portion 128B of second skin 128. Transition portion 126C of first skin 126 may define a step-shaped transition between peripheral portion 126B of first skin 126 and main portion 126A of first skin 126 disposed inside the periphery of cellular structure 130. Transition portion 128C of second skin 128 may define a step-shaped transition between peripheral portion 128B of second skin 128 and main portion 128A of second skin 128 disposed inside the periphery of cellular structure 130.

The use of ultrasonic welding may also facilitate the fabrication of other components such as bracket 58, flanges and/or other accessories integrated to panels, ducts and bases described herein through the use of UAM to reduce or eliminate the use of fasteners. UAM may include stacking and fusing (e.g., welding) metallic or polymeric strips 60 in a layer-by-layer manner using ultrasonic welding to build-up such components. In various embodiments, the panels described herein may be used in components such as ducts, aircraft stringers and aircraft fuselage skins for example. The panels described herein may be used for shock-absorbing and/or insulating functions.

Figure 11:
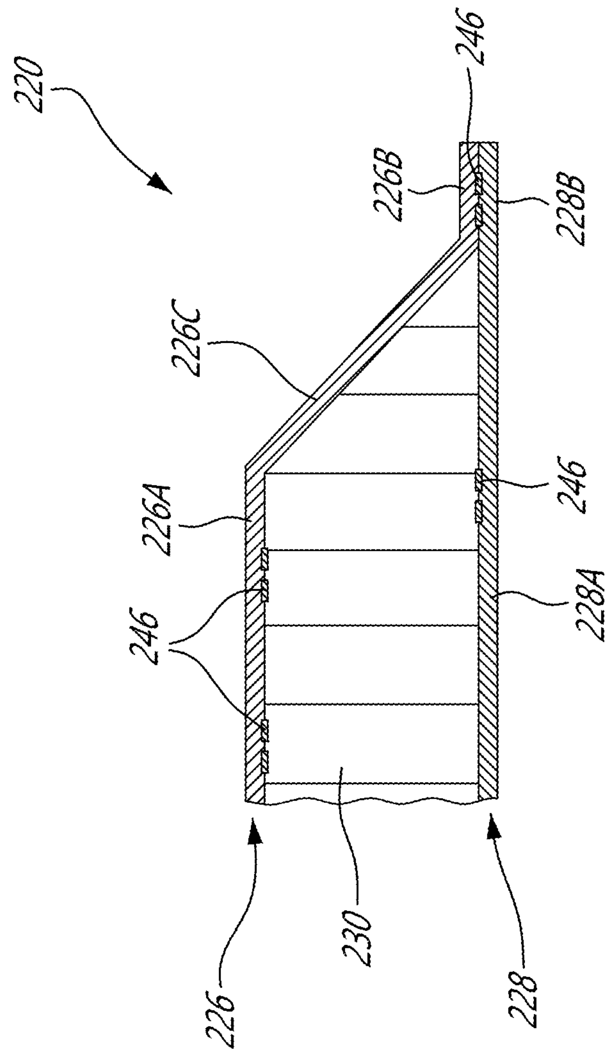
FIG. 11 is a schematic representation of part of another exemplary sandwich-structured panel.

FIG. 11 is a schematic representation of part of another exemplary sandwich-structured panel 220 which may be suitable for structural applications. In some embodiments, first skin 226 and second skin 228 may not be perforated. Panel 220 may include elements previously described above and reference numerals for like elements have been incremented by 200. Ultrasonic welding may be used to produce weld junctions 246. One or more weld junctions 246 may be produced between main portion 226A of first skin 226 and cellular structure 230. One or more weld junctions 246 may be produced between main portion 228A of second skin 228 and cellular structure 230. One or more weld junctions 246 may be produced between peripheral portion 226B of first skin 226 and peripheral portion 228B of second skin 228. Transition portion 226C of first skin 226 may define a ramp-shaped transition between peripheral portion 226B of first skin 226 and main portion 226A of first skin 226 disposed inside the periphery of cellular structure 230.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A duct comprising:

an annular base having a radially inner side defining a recess; and a sandwich-structured panel including:

a first skin welded to the radially inner side of the annular base so that a main portion of the first skin is received into the recess of the annular base and a peripheral portion of the first skin outside of the main portion is welded to a peripheral portion of the annular base outside of the recess;

a second skin disposed relative to the first skin to define a cavity between the first and second skins; and a cellular core disposed in the cavity between the first and second skins;

wherein:

the peripheral portion of the first skin is disposed outside a periphery of the cellular core;

a peripheral portion of the second skin is disposed outside the periphery of the cellular core and faces the peripheral portion of the first skin, the peripheral portion of the second skin being adjacent the peripheral portion of the first skin; and the peripheral portion of the first skin and the peripheral portion of the second skin are welded together.

2. The duct as defined in claim 1, wherein the second skin is welded to the cellular core.

3. The duct as defined in claim 1, wherein the second skin is perforated.

4. The duct as defined in claim 1, wherein the first skin defines a step-shaped transition between the peripheral portion of the first skin and the main portion of the first skin disposed inside the periphery of the cellular core.

5. The duct as defined in claim 1, wherein:

the cellular core is a first cellular core;

the cavity is a first cavity;

the peripheral portion of the second skin is a first peripheral portion of the second skin;

the sandwich-structured panel includes:

a third skin disposed relative to the second skin to define a second cavity between the second and third skins; and a second cellular core disposed in the second cavity between the second and third skins;

wherein:

the second skin has a second peripheral portion disposed outside a periphery of the second cellular core;

a peripheral portion of the third skin is disposed outside the periphery of the second cellular core and faces the second peripheral portion of the second skin, the peripheral portion of the third skin being adjacent the second peripheral portion of the second skin;

the second peripheral portion of the second skin and the peripheral portion of the third skin are welded together; and the second and third skins are perforated.

* * * * *